No. 703,335. Patented June 24, 1902.
F. H. COTTRILL.
MACHINE FOR PRINTING AND EMBOSSING CHECKS.
(Application filed Dec. 17, 1901.)
(No Model.) 8 Sheets—Sheet 1.

Witnesses:
Geo. W. Young,
Harry J. Wood.

Inventor
Frank H. Cottrill
By Livingston A. Thompson
Attorney

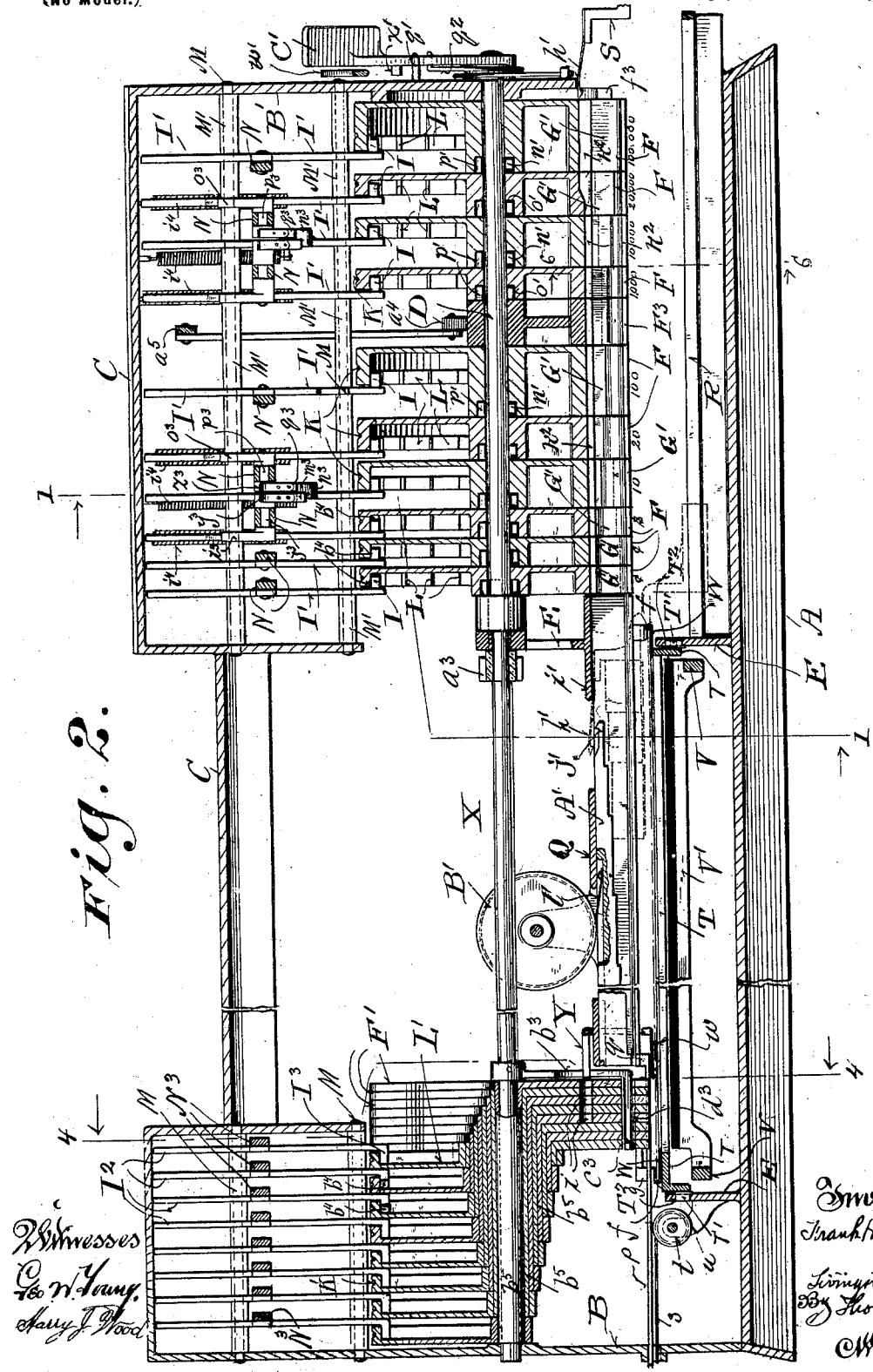

No. 703,335. Patented June 24, 1902.
F. H. COTTRILL.
MACHINE FOR PRINTING AND EMBOSSING CHECKS.
(Application filed Dec. 17, 1901.)
(No Model.) 8 Sheets—Sheet 3.

No. 703,335. Patented June 24, 1902.
F. H. COTTRILL.
MACHINE FOR PRINTING AND EMBOSSING CHECKS.
(Application filed Dec. 17, 1901.)
(No Model.) 8 Sheets—Sheet 4.

Witnesses:
Geo W Young,
Harry J. Wood

Inventor
Frank H Cottrill
By Livingston & Thompson
Attorneys

No. 703,335. Patented June 24, 1902.
F. H. COTTRILL.
MACHINE FOR PRINTING AND EMBOSSING CHECKS.
(Application filed Dec. 17, 1901.)
(No Model.) 8 Sheets—Sheet 5.

Witnesses
Geo. W. Young,
Harry J. Wood

Inventor
Frank H. Cottrill
By Livingston A. Thompson
Attorney

THE NORRIS PETERS CO., PHOTO-LITHO., WASHINGTON, D. C.

No. 703,335. Patented June 24, 1902.
F. H. COTTRILL.
MACHINE FOR PRINTING AND EMBOSSING CHECKS.
(Application filed Dec. 17, 1901.)
(No Model.)
8 Sheets—Sheet 6.
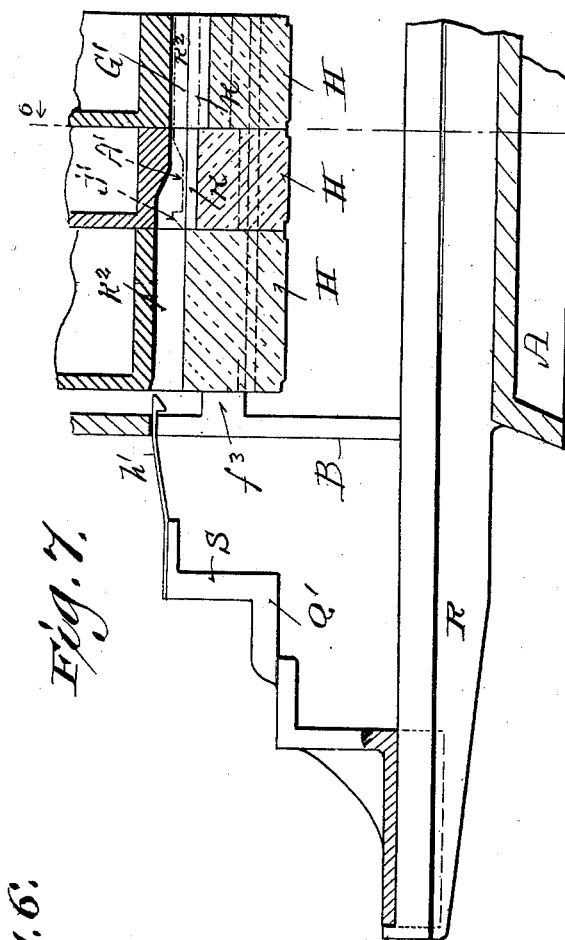
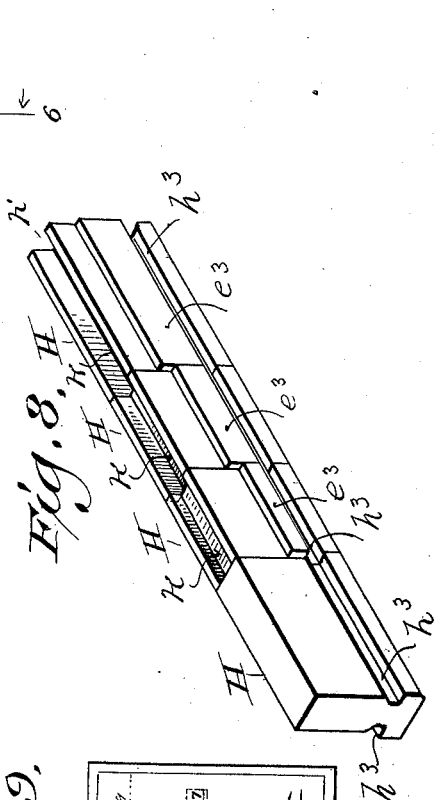
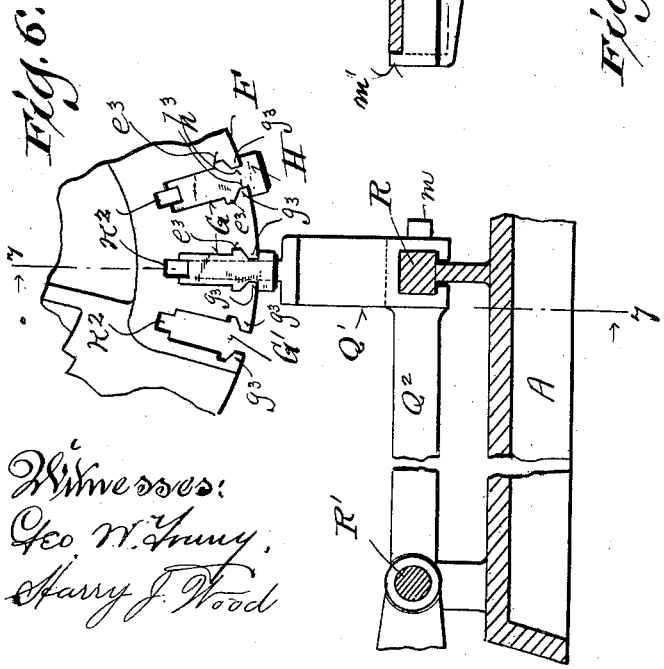
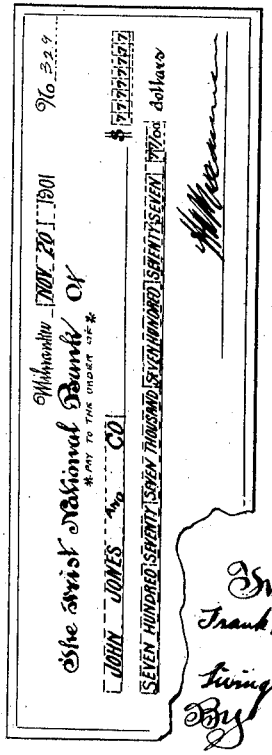

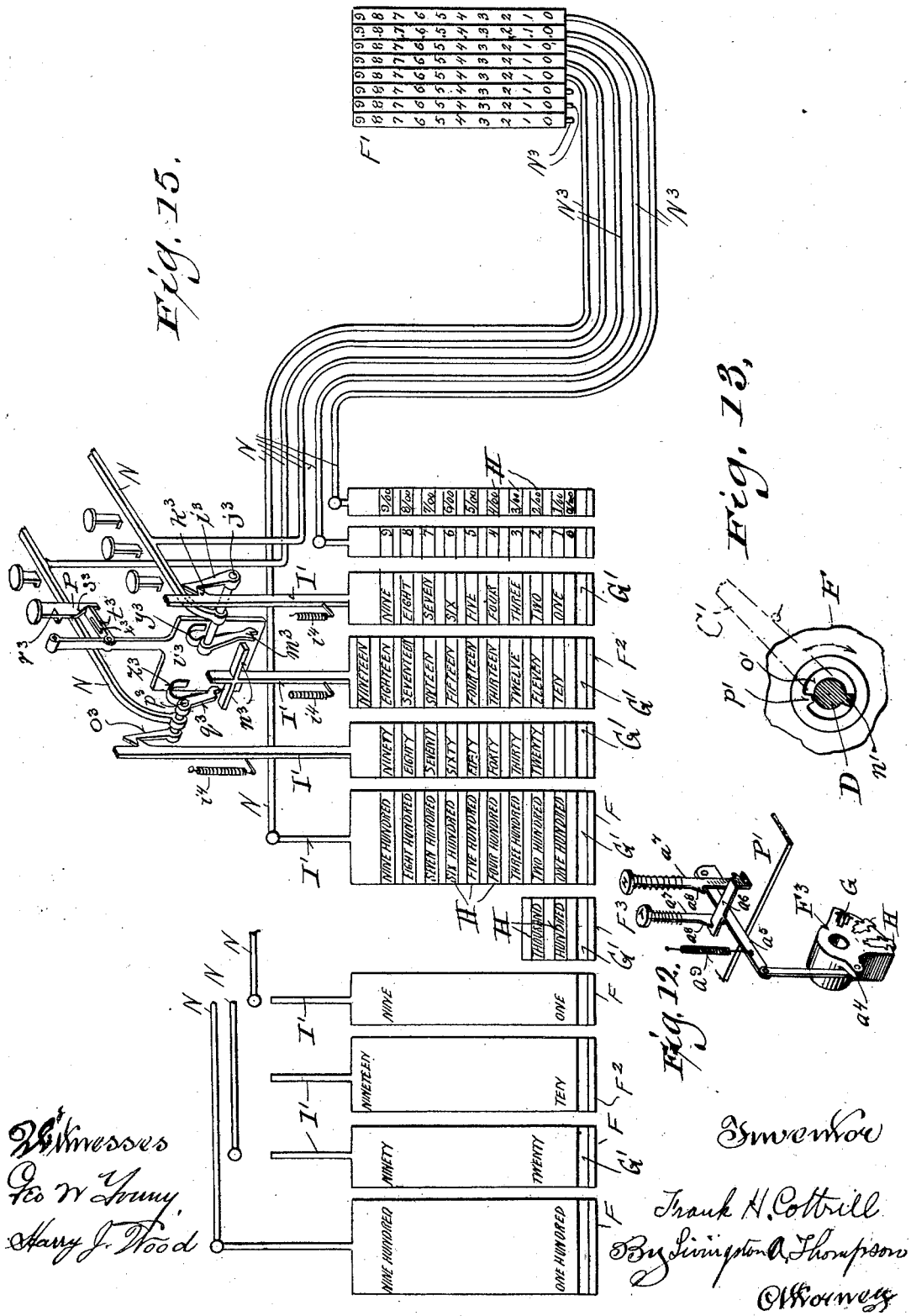

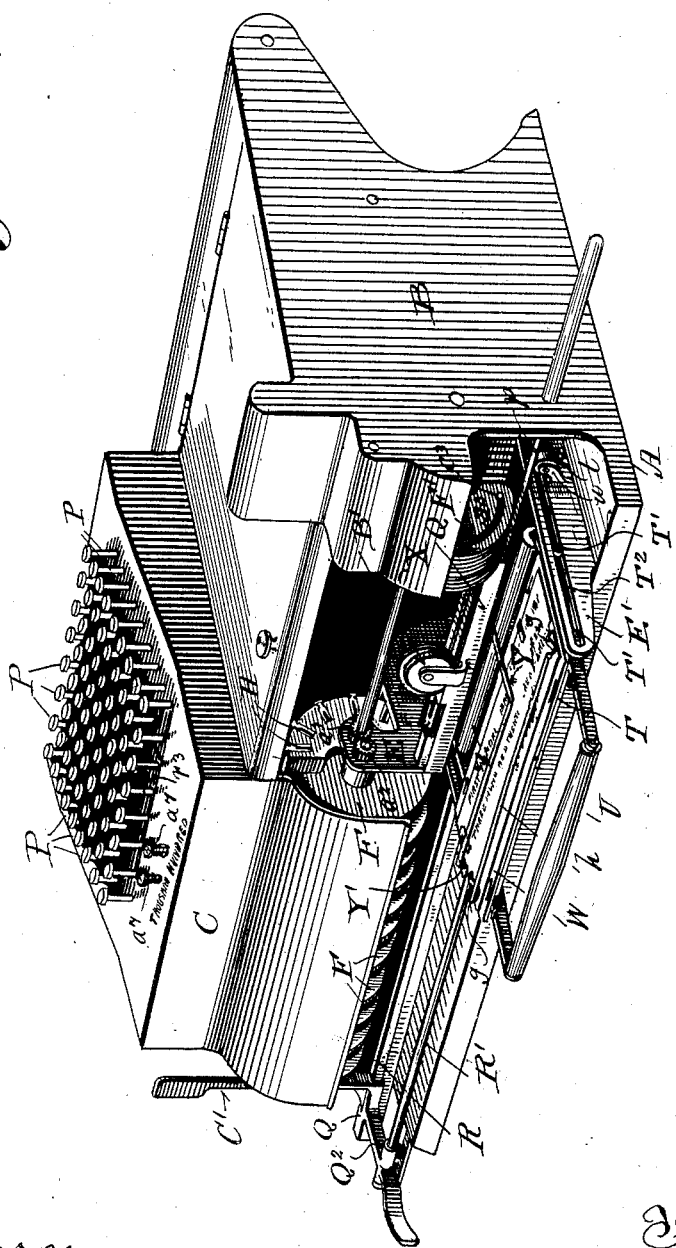

UNITED STATES PATENT OFFICE.

FRANK H. COTTRILL, OF MILWAUKEE, WISCONSIN.

MACHINE FOR PRINTING AND EMBOSSING CHECKS.

SPECIFICATION forming part of Letters Patent No. 703,335, dated June 24, 1902.

Application filed December 17, 1901. Serial No. 86,192. (No model.)

*To all whom it may concern:*

Be it known that I, FRANK H. COTTRILL, a citizen of the United States, and a resident of Milwaukee, in the county of Milwaukee and State of Wisconsin, have invented a Machine for Printing and Embossing Checks; and I do hereby declare that the following is a full, clear, and exact description thereof.

My invention has for its object to provide a machine which is capable of printing and embossing the desired amount upon a blank check or draft with a greater speed than can be obtained by the methods now in use, said amount being printed in characters simultaneously with the amount in figures at a predetermined position, together with the date and also the name of payer, if so desired; and it consists in certain peculiarities of construction and combination of parts, to be fully set forth hereinafter with reference to the accompanying drawings and subsequently claimed.

Figures 1, 11:
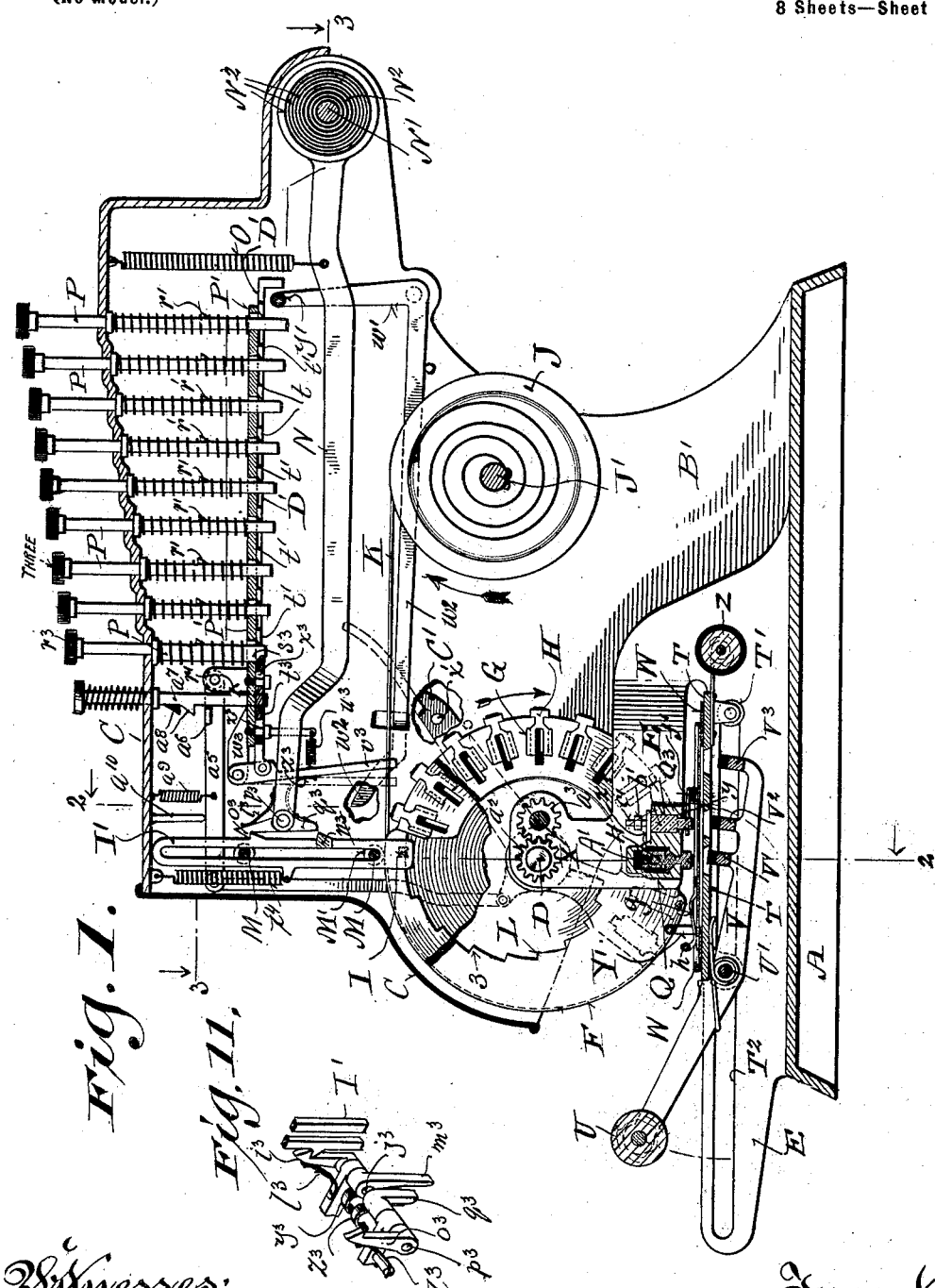
Figure 3:
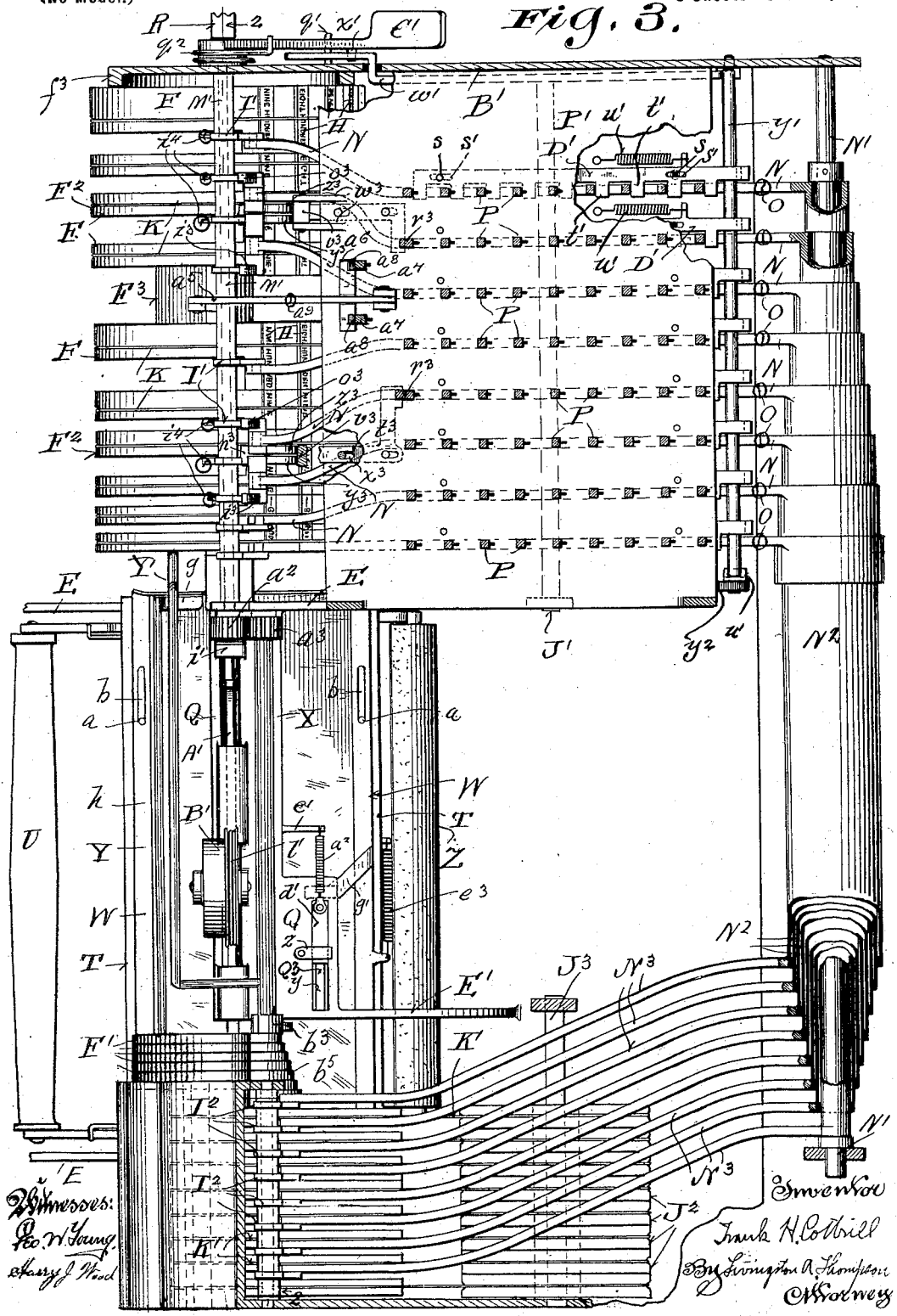
Figure 4:
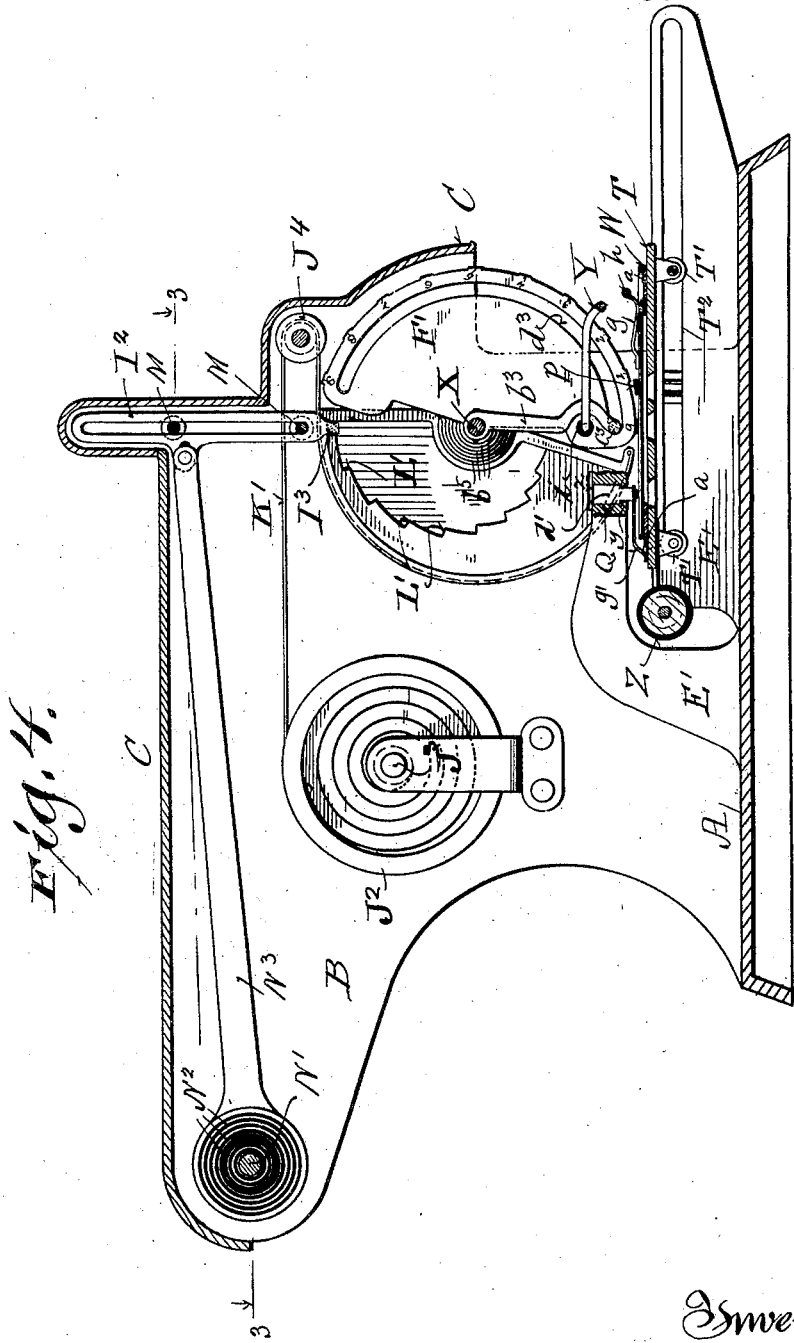
Figure 5:
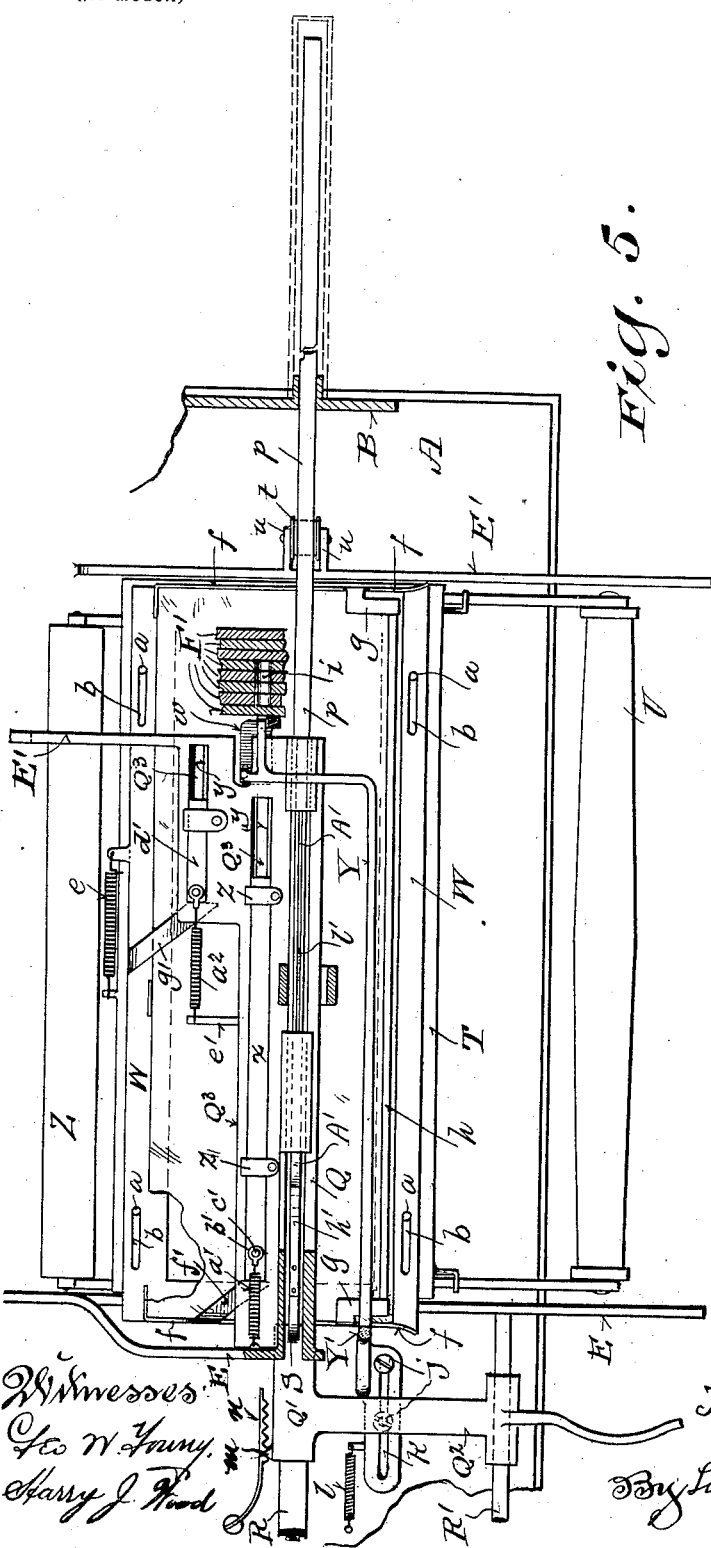
Figure 10:
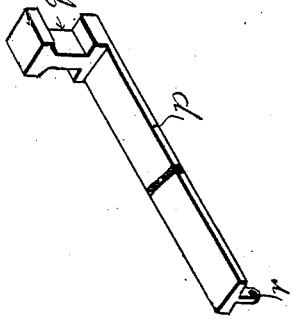

In the drawings, Figure 1 is a transverse section of the machine, indicated by line 1 1 of Figs. 2 and 7. Fig. 2 is a vertical section through the same, indicated by line 2 2 of Figs. 1 and 3. Fig. 3 is a plan view, with the upper part of the machine-casing cut away and parts in section, as indicated on lines 3 3 of Figs. 1 and 4. Fig. 4 is a cross-section on line 4 4 of Fig. 2. Fig. 5 is a plan view of the check-carrier frame, with portions broken away and in section to better illustrate the parts. Fig. 6 is an enlarged detail section on line 6 6 of Fig. 2 of a portion of one of the type-holders and the type-pusher, and Fig. 7 is a vertical section of the same on line 7 7 of the preceding figure. Fig. 8 is a perspective view of a series of the blocks of type, and Fig. 9 illustrates a check having printed thereon the amount covering the greatest space required in my present machine. Fig. 10 is a perspective view of the blank strip for filling out the line when a small amount is to be printed, and Fig. 11 is a detail perspective view of the shifting device for the type-holders. Fig. 12 is a perspective view illustrating the mechanism for bringing the word "Hundred" or "Thousand" to the printing-line when required. Fig. 13 is another detail cross-section showing the mechanism for recovering the type-holder, and Fig 14 is a perspective view of the entire machine, and Fig. 15 is a diagrammatic view illustrating the method of operating the holders.

Referring by letter to the drawings, A is the base, and B B' the side standards, of my machine, and C the casing. A shaft D has its bearings in the side frame B and a bracket E. Loosely mounted on said shaft are a series of holders F, which have slotted openings G equidistant apart for the reception of a series of type-blocks H. These type-blocks, eight to ten in number, cover a distance of approximately one-half the diameter of the holders, there being ten or eleven type-slots and eight or ten type. The empty slot G' is normally at the printing-line at the lower edge of the wheel and is held in this position by a lug I of a bolt I', fitting into a recess $b^4$ in the upper part of the wheel F (it being understood that all the wheels in the series are similarly constructed) against the resistance of a spring-drum J, loose on a shaft J', which is connected to the aforesaid disk by a flexible cord K, running over the periphery of the former on the opposite side thereof from that occupied by the type-blocks, the cord being secured to the holder at a point near the empty slot G', and upon this side of the holder is cut a series of steps L, spiral in form, from the periphery to the center, this side of the holder being reduced in width, as best illustrated in Figs. 2 and 3. The bolts I' are slotted for the reception of stay-rods M M, which guide the latter, and a series of thimbles M' are interposed between said bolts to space the same at a proper distance apart. Secured to the several bolts are a corresponding series of levers N, which, as shown, are pivoted upon a shaft N' by means of a series of tubes $N^2$, secured to the former and telescoping each other. The levers are held in their normal position by springs O, a series of spring-controlled pins P having bearings in a plate P' and casing C and projecting above the latter and terminating with a series of keys to be manipulated by the operator. These pins are directly over the levers N, arranged in columns of nine, and are marked to correspond with the characters on the type-blocks they control through their respective levers, and by reason of the distance between the lever N and the bottom of said pins varying, while the movement of each is the same, each will press the lever N down when operated upon a varying degree, as, for example, if it was desired to use the type character marked "Three" the key correspondingly marked would be pressed down and would oppose the lever N (for illustration) three spaces before it had reached the limit of its movement, consequently moving the latter down three spaces, together with the bolt to which it was attached, thereby causing the lug I to be withdrawn from its locking-recess. The wheel-holder would then be free to revolve until its step marked "Three" (which corresponds to the aforesaid type-block in its position upon the holder) contacts with the lug which is now in the path of its travel, and would arrest the holder at its printing-point and in line with the series of slotted openings G' in the holders, which are still in their normal position. This operation may be repeated until all the desired holders are at the printing-point or discharge-line, and, as is readily understood, the type are now in a position to be shoved forward through the line of open slots in the various holders which have not been disturbed into a type-bed Q, which is slotted to correspond with the type-blocks and is rigidly supported between the brackets E and E' and, as shown, is made in one piece with the latter. In order to discharge these type into the type-bed, I provide a sliding pusher Q', which moves forward upon a track R and a parallel guide-rod R', said pusher being reduced so as to form a finger S, that projects upward in the path of the open type-slots G', and when moved forward opposes and carries with it the first type of the series which may be in its path, thereby carrying with it all of the preceding type-blocks and discharging the latter into the type-bed, leaving the first one of the series at the common printing-point free of the holders. A carriage T, having guide-rollers T' secured to the under side thereof and projecting into slots T² in the brackets E and E', is located directly beneath the type-bed and adapted to be reciprocated horizontally by means of a spring-controlled handle U, which is pivoted upon the shaft of the front rollers of said carriage and has arms V projecting forward beneath the frame, said arms being connected by parallel printing-strips V' V² V³ in line with the type above. These strips are capped with any soft material, such as rubber, for the purpose of embossing, the carriage being provided with slots through which the strips may be forced upward when the handle U is pushed down, thereby making an impression upon the face of the check, which is between said carriage and type-blocks, the impression being slightly impressed from the above or embossed.

For the purpose of securing the check to the carriage the latter is withdrawn from beneath the printing-point and the check inserted upon a rectangular frame W, said frame being secured to the carriage by means of pins $a$, passing through slots $b$ in said frame, the latter being held toward the right-hand end of the machine against the pins $a$ by means of a spring $e$, connected thereto and the carriage T. The frame at either end is slightly raised to form a bead $f$ for the purpose of guiding the check when placed in position, the beads having a short right-angle turn at the back, against which the check abuts when it is inserted, and at the front of said frame and integral with the beads $f$ $f$ are a pair of springs $g$ $g$, pressing downward upon the frame W and curled up at their front ends, where they are connected together by a rod $h$. These springs are lifted up by means of the rod, and the check is inserted between them and pushed back until it comes against the right-angle portion of the aforesaid beads, when the springs are released, thereby clamping the check firmly with the frame W.

In order that the machine may automatically print the figures upon the check, as well as printing out the amount in characters, so as to form an absolute check against any possibility of changing the amount upon its face, I provide another series of holders F' at the opposite or right-hand end of the machine of the same diameter and on the same horizontal plane as the type-holders, but slightly off the vertical center of the latter, so that their printing-point will come at the proper place upon the face of the check above the line of the printed characters and at the right-hand corner of the check. These holders have the figures "0" to "9" permanently secured or raised upon their periphery through a distance of approximately about one-half their diameter, the figure "1" being one space from the printing-point when the machine is at rest, the space L' being similar to that of the type-holders upon the opposite side from the printed characters and corresponding therewith. This half of the holder, however, in order that the proper space for the operation of the bolts I² may be attained and also to prevent crossing actuating-lever, is offset from the figure portion thereof, but connected thereto by a series of tubes $b^5$, telescoping each other and revoluble upon a shaft X, which has its bearings in the right-hand standard B and bracket E of the machine, it being necessary for proper spacing purposes that the figures upon the several holders aforesaid are equally spaced apart. The bolts I² are permanently attached to a series of levers N³, which are secured to the telescoped tubes N². Thus it may be seen that each tube has two levers forming a part thereof, and when a lever N at the left-hand end of the machine is pressed down it will also carry down its corresponding lever N³, thereby releasing the holder controlled by its bolt simultaneously with the release of its corresponding type-holder, thus bringing to the printing-point simultaneously the character-printing and the number-printing types. The number or figure holders are revolved when released by a flexible cord K', secured to a spring-drum J², loose upon a shaft J³, the spring being fast to the shaft at one end and connected at its outer end to the drum J². The cord K' is passed from the drum over a loose pulley J⁴ in front of the bolts I² and thence down and back over the periphery of the stepped portion of the holders, thus reversing the direction of travel of the holder F' from that of the type-block holders F, the object of which will be set forth more particularly hereinafter.

When an amount is to be printed of any denomination less than that illustrated in the check shown by Fig. 9 of the drawings—as, for instance, to print seven dollars and seventy-seven cents—it would require only the last three figure-holders, they being cents and dollars, to print the amount, and as the dollar-mark upon the check is so arranged that it would normally be directly in front of the full amount (the machine being shown to print in eight figures) there would be a blank space equal to the four figures not used between the "7.77" and the dollar-mark. This would be objectionable for the reason that the check could be raised, and it also would not be desirable for those skilled in the art, who expect the amount to appear directly to the rear of the dollar-sign. To avoid this, I provide a series of perforations $i$ in the first five holders F', which are in register when the machine is at rest, and fastened to the base of the machine is a sliding bar Y, which has a foot that is secured by screws $j$, passing through a slot $k$ to permit of forward motion. The bar is turned upward at Y from its foot and contacts with the left-hand side of the check-frame W and passes over the latter and terminates directly in front of the first figure-holder concentric with the registered perforations $i$, there being a spring $l$ to normally hold said bar Y in this position. Now if the three type-blocks "seven $\frac{77}{100}$" be pushed into the type-bed Q (the check-frame and carriage having been drawn out of the machine for the insertion of the check) the pusher Q' will then be moved forward until the bridge-piece Q² of the latter contacts with the turned-up portion Y' of the bar Y, and as only the last three figured holders F' have been moved to get the aforesaid amount the registered openings $i$ in the preceding holders have not been disturbed, and consequently the push-rod will force the bar Y into the holders through the entire line of perforations and abut the wall of the first solid holder, carrying with it the check-frame, which is at all times in contact with the upright portion Y' of said bar. By this operation when the check is placed in the frame, the bar Y having been moved forward five spaces or the thickness of the first five holders F', it will be seen that when the check is pushed under the type-bed to be printed the dollar-mark will come directly in front of the desired amount. The push-rod Q is held in this position by a tooth $m$, locking into a spring $n$, which is corrugated to correspond to the number of spaces desired to move the check-frame, said spring being of just sufficient strength to resist the retracting-spring $i'$ of the bar Y and spring $e$ of the check-frame, but will yield and disengage the push-rod when the latter is shoved back by hand. It is obvious that when the type are once in place that a number of checks—as, for instance, for pay-rolls where the amounts are the same—can now be printed as fast as they can be inserted upon the frame, the only motion being to withdraw the carriage, insert a check, push the former back, and press the handle down, the type being inked each time by the ink-roller Z, which is secured to the carriage. As illustrated in Fig. 5 of the drawings, the first holder has been moved and the push-rod is checked against further movement forward by the bar Y, so that the full amount or capacity of the machine as here shown is to be printed—as, for instance, $900,000,00.

When only a small number of the type-blocks are pushed into the frame, it is necessary to fill out the space between the last block and the word "Dollars" at the end of the line, and for this purpose I provide a thin metal strip (see Fig. 10) $p$, the inner end of which has an upward extension or block $q$, which conforms to the lower portion of the type-slot in the bed Q, wherein it is fitted and adapted to be slid. At the outer end is a lug $r$, to which is secured a cord $s$, that passes over a spring-drum $t$, revoluble upon a trunnion that is hung in ears $u$, projecting from the bracket E', secured to an opening. In the side standard B is a tube or guard in which the strip $p$ rests when pushed out by the type-block against the resistance of the spring-drum $t$, said strip being of the same horizontal plane as the face of the type, and consequently when the printing-strip V' is forced up against the type it will print the latter on the face of the check, together with the length of the strip $p$ that has not been forced out of the type-bed by the type-blocks, and when the latter are withdrawn from the former, the spring-drum will exert its force to draw the strip $p$ back into the printing-bed, throughout its entire length, it being understood, the latter is open at both ends, at the front or left-hand end for the reception of the type-blocks H, when discharged from the holders F, and the left-hand end for the free reciprocation of the strip $p$.

The rubber capping upon the several printing-strips V' V² V³ is of the same length as the maximum length to be printed upon a check. Consequently if only two or three figures were printed and as all the figured holders normally stand at zero even though the check was moved so as to print directly behind the dollar-mark when the impression was made, all of the holders ahead of the amount printed would be exposed to the printing-strip V², and in order to prevent them from making an impression upon the check a thin metal guard $w$ is secured to the bar Y in line with the printing-point of the holders F' and just below the type thereof and normally resting beyond the face of the first holder, so that when the bar Y moves into the holders it carries the guard $w$ with it and protects the type which are not in use from the printing-strip.

In banking-houses it is a custom to keep stencils of the names of commercial houses which do a large volume of business with them, as frequently they will require a number of drafts to their order at a time, and in these instances the name is stenciled upon the check to facilitate speed. For this purpose the bed Q has a slot Q³ for the reception of an interchangeable die $x$, the slot being of greater length than the die and reduced at its under side to form a shoulder $y$, upon which the die rests, the type of which projects downward to a common plane with the type previously described. Buttons $z z$, pivoted to the upper face of the bed-plate, lock the die into the latter, and a spring $a'$ is secured to a bracket E, the other end being provided with an eyelet $b'$, which is slipped over a pin $c'$ and holds the die against the left-hand end of the slot. Another die $d'$, parallel with the aforesaid and similarly arranged, is provided for the date, the spring $a^2$ of which is in this instance attached to a pin $e'$, projecting from the type-bed Q. A pair of thin metal cams $f' g'$ project from the edges of the movable check-frame and abut the left-hand ends of the dies $x d'$ when the latter are in their normal position; but if the check is moved back of bar Y, as previously described, the frame W when pushed into the machine will cause the faces of the cams $f' g'$ to move both dies the same distance as the frame has been moved previously, thereby printing the name and date of check always at the same position upon the latter.

After a check or a number of checks have been printed, to recover the machine to normal the operator first draws back the push-rod Q', the finger S of which is resting in the type-slot, as shown in dotted lines in Fig. 2, and at the upper end is secured a spring-catch $h'$, and as the upper portion of the type-slot in the bed Q is open at this point the catch is free and the spring resistance of the latter is exerted to lift it; but the instant it is withdrawn the closed bridge $i'$ of the bed Q forces the catch down to engage a notch $j'$ in a type-block carrier A' and pulls it through the holders F, carrying the type-blocks with it, said carrier being stepped equidistant in a downward direction from its notched end $j'$ to correspond to the number and width of the aforesaid holders and type-blocks, with the exception of the cents-holder, of which there are two. In this instance it is only necessary to have one step for both, as in all cases their type-blocks would be moved together, they standing normally at "0–$\frac{0}{00}$," and having no empty slots are always in use.

The type-blocks H have rectangular grooves $k'$ centrally cut through them at their upper edges, said grooves being cut at different elevations to correspond to the steps in the carrier, those in the cents-holder being the deepest, while those in the tens-of-thousands holder are of the least depth, there being none in the hundreds-of-thousands-holder blocks, as the extreme end of the carrier A' will abut the end of these blocks if they were in the type-bed. The type-slots G of the holder F at their bottom are slightly reduced and extend above the type-blocks to form a groove $k^2$, through which the carrier A' passes, which is of just sufficient width to fill said groove, thereby holding the catch $h'$ in clutch with the aforesaid carrier until it reaches the inner face of the last holder. The groove $k^2$ at this point deepens suddenly and allows the spring-catch $h'$ to rise and disengage the carrier, which is withdrawn from the holder by a cord $l'$, attached to the former, and a spring-drum B', that is wound up when said carrier is drawn into the holders, the spring-drum being of the same type as that previously described and is revoluble upon a stud mounted in ears rising from the type-bed at either side of the type-block slot therein. The carrier A' is provided with a slight groove at its top, into which the cord $l'$ rests. The push-rod after releasing the carrier continues its backing movement until it abuts a lug $m'$ upon its guide-rail R, bringing the catch $h'$ free of the holder, and as all of the type-blocks have now been restored to the holders and slots therein from which they were previously removed the next operation is to revolve them to their normal position and bring their empty slots G' back in line with the type-bed Q. This is accomplished by placing the thumb upon a lever C' (before removing the hand from the push-rod) and revolving it downward. This lever is secured to the shaft D, upon which the holders turn, and has a series of lugs $n'$ projecting therefrom on the same axial line, there being one for each holder, and adapted to oscillate in circular recesses $o'$ in the hubs thereof. The latter are each provided with a tooth $p'$, projecting in the path of the lugs $n'$, and when all the disks are at normal the teeth $p'$ are in line with each other a distance of half the circumference of the recesses from the lugs $n'$, and the lever is held against a pin $q'$ by a light coil-spring $q^2$; but if any of the holders have been used their respective teeth will be at various distances from the lugs $n'$ of the shaft D. Consequently when the latter is rotated by its lever $c'$ its lugs will pick up the teeth in their order and carry them, together with the holders, back to their position of rest, thereby winding their spring-drums J and causing the lugs I of bolts I' to drop into their locking-notches, and in order that the operator may check the amount he desires to print I provide a series of locking-combs D' for engagement with lugs $r'$ on the pins P. These combs correspond in number to the rows of pins and are secured to the under side of the plate P' by means of screws $s$ and are slotted at $s'$ to permit motion. A series of teeth $t'$ project therefrom and are held against the pins P by means of springs $u'$, and when a key is pressed down the tooth $t'$, that is resting against its pin, will drop into the lugs $r'$ of the latter and hold it down. A bell-crank lever $w'$ is pivoted to the standard B, the long arm $w^2$ of which extends forward and projects through an aperture in the standard and terminates in a foot that rests in the path of a stud $x'$. The short arm of said lever carries a rod $y'$, that is yoked to another similar short arm which has its bearings in an ear $y^2$, that depends upon the plate P. The aforesaid rod $y'$ is at right angles to the combs, which are turned down at the ends in the path of the former. The locking mechanism of the keys having been described, it is obvious that when the hand-lever C' is pulled the stud $x'$ will raise the arm $w^2$ of the bell-crank lever $w'$ and rock the rod $y'$, which will engage the down-turned ends of any combs that have moved forward and withdraw the latter from the lugs $r'$ of the keys which shoot upward to the level of those not in use. Fast to the shaft D' at its inner end is a spur-wheel $a^2$, which meshes with a similar wheel $a^3$, fast on the figure-holder shaft X. An arm $b^3$ is also secured to this shaft adjacent to the first of the figure-holders F', having a pin $c^3$ projecting through the entire series of said holders, the latter being cut away to form radial slots $d^3$, which extend the distance of the travel of holders, the normal position of the pin $c^3$ being at the bottom of the slots, so that all holders are free to rotate when released for printing; but when the lever C' is pulled down to retract the holders F it will through the spur-wheel $a^2$ rotate the wheel $a^3$ in the opposite direction, together with its shaft and arm $b^3$, which will pick up the holders that have been used and carry them back to normal simultaneously with the holders F at the other end of the machine.

As best illustrated in Fig. 8 of the drawings, the type-blocks are provided with shoulders $e^3$ of the same width in cross-section, but at different elevations, or, in other words, they are stepped off in the opposite direction from the grooves or steps which are engaged by the carrier A'. These shoulders $e^3$ are for the purpose of preventing the overthrow of the type-blocks when carried to their respective holders, the latter having these slots cut away or increased in width to correspond to the shoulders $e^3$, each shoulder being of a different height to correspond to the shoulders upon its type-back, those of the holder next to the one farthest from the printing-bed Q being the lowest, so that it will pass freely through all preceding slots and abut the last holder, the type of which, as in the case of the carrier-grooves, has no shoulder $e^3$, but are slotted by an annular rib $f^3$ upon the side standard B, which is cut away at the bottom a sufficient width to admit the finger S of the push-rod Q'. The type-slots G are also reduced at the periphery of the disks to form a track $g^3$, on which the type-blocks slide, a groove $h^3$ being cut in the latter to keep them vertically rigid within the holders.

By referring to the diagram view Fig. 15 of the drawings it will be seen there are ten holders F, eight of which have the combinations of type-blocks of the denomination from one dollar to nine hundred and ninety-nine thousand, inclusive, in words which I have designated as characters, and two holders with type-block combinations ranging from naught to ninety-nine cents in figures, they being nearest the type-bed Q, while to the right are a group of eight holders F', the space between the two sets of holders being for the type-bed. (Not shown in the diagram.) This last-named group of holders have the amounts in figures permanently secured to their peripheries to correspond to the character-holders and, as previously described, are actuated by a system of keys and levers N N³, so as to set up the amount desired in words and figures simultaneously with one operation of the keys; but in some instances it occurs that the written amount may be in one word, while it will require more than one figure to represent it, or, in other words, it will become necessary to move two figure-holders to one of the character-holders. To overcome this obstacle, the lever N, which controls the dollar-holder, in place of being permanently attached to its bolt I' has a pull-pawl $i^3$, fast to a stud $j^3$, trunnioned at its end for engagement with a tooth $k^3$ upon its bolt I', and is normally held in this position by a light spring $l^3$ upon the opposite side of the lever N. A pull-pawl $m^3$ is also fast to the stud $j^3$ and projects downward and in the path of a tooth $n^3$ on the bolt I' of the next disk F², to the left of which are the amounts in dollars, from ten to nineteen, or ten blocks of type in place of nine. The next holder, which runs from twenty to ninety, has only eight blocks, and like the dollar is normally connected to its lever N through a pawl $o^3$, having its stud $p^3$ trunnioning in said lever, with a push-pawl $q^3$ secured to the stud at its opposite end. This pawl is also in the path of the tooth $n^3$ of the bolt which controls the disk F², and by the above arrangement it will be seen that the latter holder has no lever or key to operate it, but is actuated entirely through the dollars and tens-of-dollars keys, so that should, for example, the amount thirteen dollars be required the keyboard, which shows eight lines of keys running from one to nine and numbered accordingly, will show the operator at a glance that the first two lines are cents, the next line dollars, tens, hundreds, &c., and to get thirteen he must strike two keys—the first key $r^3$ in the tens-bank, which would give him ten dollars, and the third key in the dollar-bank, making thirteen. The pin P of key $r^3$ is of greater width than the others in the tens-line and has a bevel $s^3$ at its lower end, and when depressed its first movement will cause the beveled portion to force outward a tongue $t^3$, which is held against the former by a spring $w'$, the tongue at its outer end being connected to a bar $v^3$, that is pivoted between ears $w^3$, projecting from the plate P', the tongue $w^3$ being secured to the latter at its under side by means of screws passing through slots $x^3$. Thus when the tongue moves out it swings the bar $v^3$ out with it, which strikes two spring-pieces $y^3$ $z^3$, respectively secured to the push-pawls $i^3$ $q^3$, and disengages the pull-pawls $m^3$ $o^3$ from their respective bolts I' against the pressure of the springs which held them. This movement throws the pawls $m^3$ $q^3$ into the path of the tooth $n^3$ of bolt I, which controls disk $F^2$. The nose of pawl $q^3$ strikes the tooth $n^3$, and key $r^3$ now completes its movement and strikes its lever N, moving it down one space and carrying with it down one space the bolt I' of holder $F^2$ which revolves one space, bringing the ten at the printing-point, the lever N in the meantime, through its corresponding arm at the other end of the machine having released the tens-figure holder and moved it one space, brings the figure "1" at the printing-point. The key $r^3$ is now locked, as previously described. The push-pawl $m^3$ is one space longer than that of pawl $q^3$ and consequently when they are both swung over to engage tooth $n^3$, while pawl $q^3$ catches it, pawl $m^3$ moves over and rests against it. The movement of bar $v^3$ having simply compressed the spring-piece $y^3$ but when the bolt I' is forced down as above described, the tooth $n^3$ drops past the nose of the pawl $m^3$, the latter snaps into place over the tooth and disengages its pull-pawl $i^3$ from its normal connection with the dollar-bolt I' of the dollar-holder, so that the next operation of pressing down the three keys in the dollar-row will move the bolt I' of holder $F^2$ down three more spaces, thereby bringing the type-block 13 at the point of discharge, and also revolving the dollar-figure holder F three spaces, which together with the "1" previously moved, makes the amount thirteen ("13") at the printing-point, it being understood that bolts I' not directly connected to their levers N are held up by a spring $i^4$. The holders which run from one thousand to nine hundred and ninety-nine have a similarly-constructed shifting mechanism as that of the "teens" just described, and between the first holder of the thousands, which runs from one to nine, and the hundreds-holder, that runs from one hundred to nine hundred, is a segmented holder $F^3$, which has two type-blocks and one empty slot G', which normally stands at the printing-point like the other holder, the two type-blocks having the words "hundred" and "thousand" upon them. This segment is loosely mounted upon the shaft D and has no recovering-lug at its hub, but projecting therefrom is an arm $a^4$ that is linked to a spring-controlled lever $a^5$ pivoted in the ears upon the plate P', and has projections $a^6$ at either side for engagement with a pair of spring-controlled pins $a^7$ which project through the upper casing and terminate in keys marked "Hundred" and "Thousand." The pins $a^7$ of these keys are locked by the combs of the other keys when pressed down, each of which has a tooth $a^8$ $a^8$ at different elevations or one space apart for engagement with the projections $a^6$, and when any thousand from one to ninety is required the key marked "Thousand" is first pressed down. This places the type of that denomination in front of the amount you desire when it is locked in position, and when the combs are actuated by the recover mechanism it is released with the other keys and will be drawn back to place by its spring $a^9$ coming against a stop $a^{10}$. To set up an amount between nine hundred and two thousand, with the exception of one thousand, the correct way, in place of writing "one thousand three hundred," for example, would be to write "thirteen hundred." This is done by first setting up the hundred type-block, and as the amount is over a thousand we would press the keys to make up the amount by first bringing down the "ten" and then the "three," which would bring thirteen to the printing-point, as in the case of dollars previously described. We would then have the amount required, which would read "thirteen hundred."

Having thus described my invention, what I claim as new, and desire to secure by Letters Patent, is—

1. In a check-printing machine, a series of movable type-block holders, a plurality of type-blocks fitted into slots in the same, each of said type-holders having at least one more slot than type-block, means for normally keeping the holder in register whereby the empty slots are in line, mechanism for independently moving said type-holders, whereby any one of their type-blocks may be brought in register with the empty slots of the type-holder in their normal position, a type-bed having a slot therein, in register with the empty line of slots in the holders and means for discharging the type-blocks into the empty bed-slot, substantially as set forth.

2. In a check-printing machine, a series of independent type-block holders, a plurality of type-blocks fitted into slots in the same, each of said type-holders having at least one more slot in number than type-blocks, means for normally keeping a line of empty slots of the holders in register, mechanism for independently adjusting the aforesaid type-holders, whereby any one of their type-blocks may be brought in register with the empty slots of the holders that are in their normal position, a type-bed, a slot in the latter in register with the line of slots in the holders and means for discharging the type-blocks from the holders into the printing-bed, another series of holders, a plurality of type permanently secured thereto, and means for connecting said holders to the aforesaid type-block holders whereby they are simultaneously actuated, substantially as set forth.

3. In a check-printing machine, a series of independent revoluble type-block holders, a plurality of type-blocks of various numerical denominations fitted into similar slots in the same, each of said type-holders having a greater number of slots than type-blocks, means for normally keeping a line of empty slots of the holders in register, and a mechanism for releasing said holders from their normal position independently whereby any one of their type-blocks is revolved in register with the line of empty slots of the type-blocks in their normal position, a type-bed having a slot similar to, and in register with the line of empty slots of the type-block holders when the latter are in their normal position, a push-rod adapted to be reciprocated through a line of empty slots of the type-holders, and a second series of revoluble figure-type holders having a plurality of type-figures secured thereto, each of which is connected to one of the revoluble type-block carriers, whereby when any one of the latter are released to bring a type-block of any desired denomination to the normal line of the empty slots, the aforesaid type-holder will be simultaneously revolved and bring a like amount in figure to a predetermined point on the same horizontal plane as the face of the type-block, a paper-carriage adapted to be reciprocated under the type-bed, and figure-type, and a printing-lever under the paper-carriage, substantially as set forth.

4. In a check-printing machine, two series of revoluble type-holders at a predetermined distance apart, one of said series carrying blocks of adjustable type having words of various numerical quantities upon the face thereof, and the other series of holders having the same numerical quantities in figures permanently secured thereto, means for simultaneously actuating the type-holders, whereby the same numerical quantity in words and figures are brought to a common printing-plane, a type-bed adjacent to the type-holders carrying the adjustable type-block, and means for discharging the latter into the type-bed, a paper-carrier adapted to be reciprocated under the common printing-plane of the two series of type-holders, and means for impressing the type upon a blank, substantially as set forth.

5. In a check-printing machine, two series of revoluble type-holders at a predetermined distance apart, one of said series having blocks of type loosely fitted in slots therein, there being at least one more slot than type-blocks, and a series of steps upon the type-holders corresponding to the type-slots, whereby the holder is checked in one direction at various distances, bolts arranged to oppose said steps and springs to actuate said holders in opposition to bolts, levers connected to the bolts, actuating-keys to the levers, mechanism for shifting certain of the levers whereby they engage different bolts, and another series of lever-arms connected to the aforesaid levers over the other series of type-holders, a series of steps arranged upon the said type-holders, bolts in opposition to the steps and connected to the lever-arms whereby both series of holders are simultaneously actuated, springs arranged to actuate the last-named holders, and means for returning both series of holders to their normal position simultaneously, a slotted type-bed adjacent to the first-named series of holders, a push-rod in the path of the slots, and at right angles thereto, and in line with the slotted type-bed, whereby the blocks of the type in the latter are pushed into the type-bed, a paper-carriage under the latter, and printing-strips arranged under the carriage in line with the type-bed, and a a second series of type-holders, means for automatically shifting the carriage in a longitudinal direction with relation to the type-bed and last-named series of type-holders, substantially as set forth.

6. In a check-printing machine, a series of movable type-block holders, a plurality of type-blocks of various numerical denominations fitted into slots in the same, the first two of said type-holders having type-blocks of fractional denomination of currency fitted therein, the remainder of said type-holders being provided with a series of empty slots, means for normally keeping the holders in register whereby the empty slots and zero type-blocks of the fractional-currency holders are in line, mechanism for independently moving said type-holders whereby any one of their type may be brought into register with the empty slots of the type-holders in their normal position, a type-bed having a slot therein in register with the zero-blocks of the fractional-currency-type holders and the empty line of slots of the other type-holders when said holders are in their normal position, and means for discharging their type into the empty bed-slot, substantially as set forth.

In testimony that I claim the foregoing I have hereunto set my hand, at Milwaukee, in the county of Milwaukee and State of Wisconsin, in the presence of two witnesses.

FRANK H. COTTRILL.

Witnesses:
 GEO. W. YOUNG,
 JAS. A. RIGBY.